United States Patent [19]

Brzoska

[11] 3,726,160
[45] Apr. 10, 1973

[54] TOOL FOR APPLYING SUSPENSION CLAMPS TO POWER LINES
[76] Inventor: Leonard M. Brzoska, 627 Old Elm Street, Conshohocken, Pa. 19428
[22] Filed: Feb. 1, 1972
[21] Appl. No.: 222,597

Related U.S. Application Data

[62] Division of Ser. No. 69,869, Sept. 4, 1970, Pat. No. 3,670,390.

[52] U.S. Cl. ................................................. 81/3 CP
[51] Int. Cl. ............................................. B26b 27/08
[58] Field of Search ..................... 81/3 CP; 29/247, 29/249, 244, 250, 200 P, 203 P; 294/19

[56] References Cited

UNITED STATES PATENTS 2,631,363   3/1953   Fahlstrom ............................. 29/247
1,456,007   5/1923   Hartson et al. ....................... 81/3 CP Primary Examiner—Robert C. Riordon
Assistant Examiner—Roscoe V. Parker
Attorney—J. Walter Schilpp

[57] ABSTRACT

A special tool at the end of an elongated insulated pole manipulates the suspension clamp and facilitates installation thereof on high voltage electric power line conductors without de-energizing the lines. A cotter key tool facilitates inserting the cotter key in the clevis pin.

1 Claim, 6 Drawing Figures

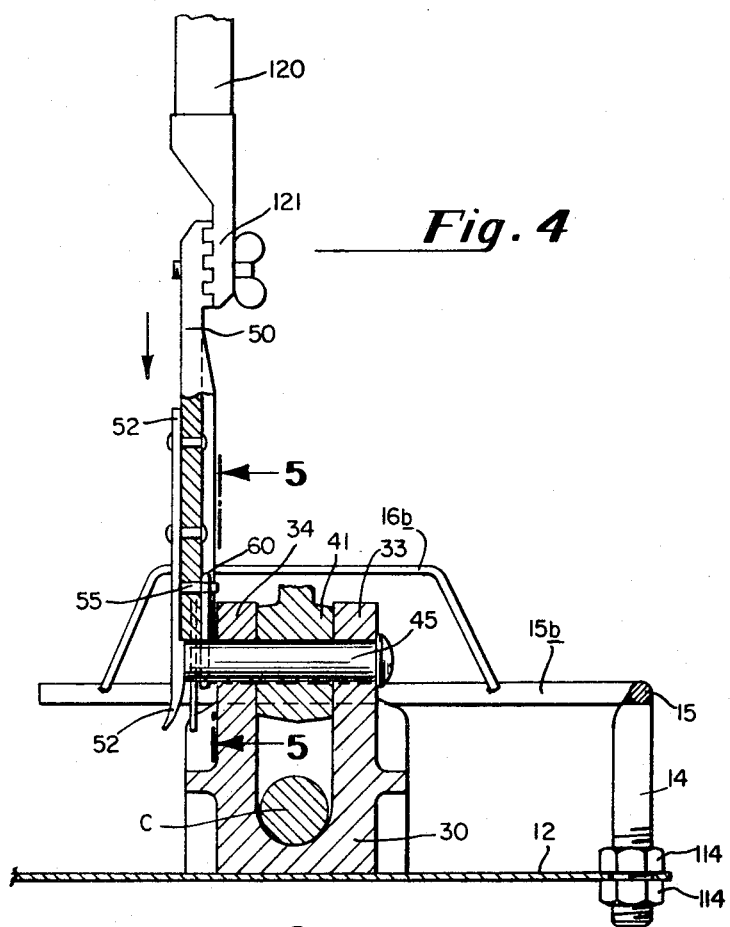

TOOL FOR APPLYING SUSPENSION CLAMPS TO POWER LINES

This is a division of application Ser. No. 69,869, filed Sept. 4, 1970 and now U.S. Pat. No. 3,670,390.

BACKGROUND OF THE INVENTION

In many installations, overhead high-voltage power line conductors are supported from strings of suspension insulators by suspension clamps. The suspension clamps are also connected to the suspension porcelain insulators by a ball and socket arrangement, the ball being part of the porcelain insulator, the socket being part of the suspension clamp.

The suspension clamps tend to become damaged by weather erosion, or by flashover, or by other forces, and replacement thereof becomes necessary from time to time. In order to avoid service interruptions, it is desirable that the suspension clamps be replaced without de-energizing the power line. Special tools have been available in the prior art attached to elongated insulated poles or so-called "hot sticks" to assist in the work of replacing the suspension clamps on energized power lines, but even when these prior art tools are used, the installation work is painstaking and time-consuming.

SUMMARY OF THE INVENTION

A principal object of the present invention is to provide an improved tool adapted to be secured to the end of an elongated pole or so-called "hot stick" which will enable the linemen much more quickly to install or replace suspension clamps on high voltage power line conductors without de-energizing the line and without any increase in hazard.

The foregoing object is achieved by connecting to the outer end of the "hot stick" a specially designed holder or carrier tool which facilitates the handling and manipulation of the suspension clamps and expedites installation thereof on the energized power line conductors.

BRIEF DESCRIPTION OF THE DRAWINGS

FIG. 4 is an elevational view, partly in section, showing the special cotter key tool being used to place the cotter key in the hole in the clevis pin;

FIG. 5 is a fragmentary view along the line 5—5 of FIG. 4 showing how the springs of the cotter key tool center the cotter key relative to the clevis pin;

FIG. 6 is a fragmentary view, partly in section, showing a suspension insulator in phantom with the ball of the suspension insulator received within the eye in the head of the socket tongue which is connected by a clevis pin to the body of the suspension clamp.

DETAILED DESCRIPTION OF THE DRAWINGS

Figure 1:
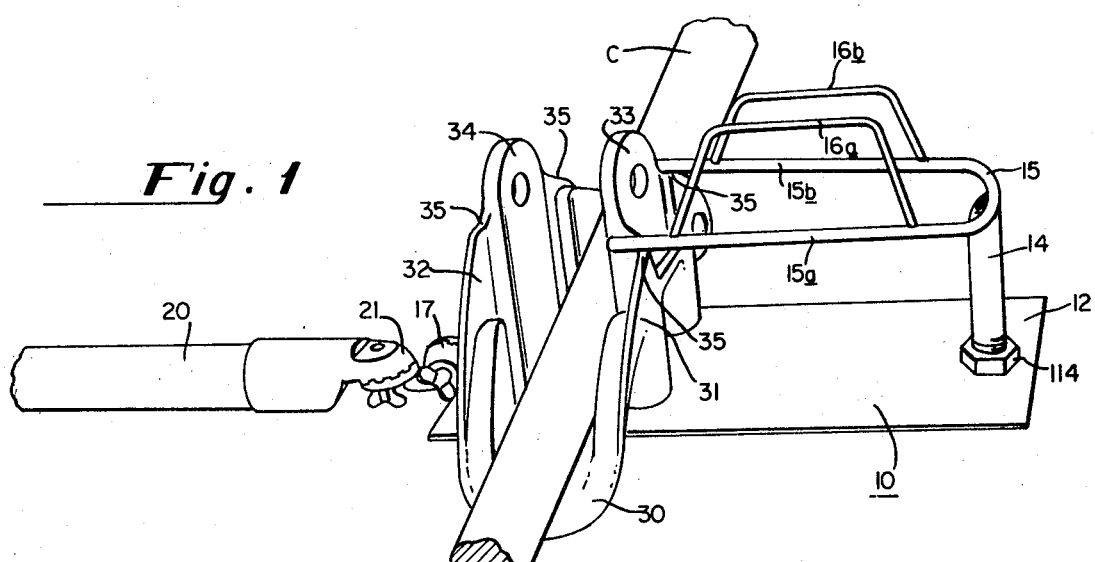
FIG. 1 is a perspective view showing the clamp tool of the present invention supporting the suspension clamp under the power-line conductor.

The special tool provided by the present invention for handling the suspension clamp during installation thereof is shown in FIG. 1 identified by the reference numeral 10. The rearward end of this tool is connected to the forward end of an elongated insulator pole or "hot stick" 20 by a pair of splined fittings 17 and 21 to provide adjustment in both the horizontal and vertical planes. One of the fittings 17 is fixed to the tool 10, and the other of the fittings 21 is connected to the forward end of the pole 20, the fittings being interconnected.

The tool 10 comprises a base plate 12, preferably rectangular, having at its forward end an upright support or post 14. Post 14 supports, in cantilever fashion, a U-shaped holder 15 having legs or rods 15a and 15b which extend rearwardly at spaced-apart separation. No support is provided for the rods 15a and 15b rearward of the forward end of the U-shaped holder 15 so as to provide a clear space for the clamp 30, as will become clear from the description which follows. Each of the legs or rods 15a and 15b is provided with a U-shaped guide arm 16a and 16b, respectively, which projects upwardly from the rods 15a and 15b.

Figure 2:
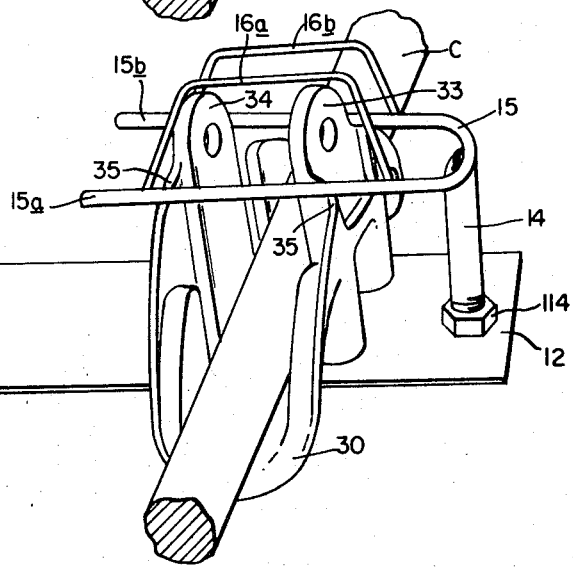
FIG. 2 is a perspective view showing the position of the special tool relative to the suspension clamp after the lineman has pulled the tool rearwardly to shift the suspension clamp toward the forward end of the tool.
Figure 3:
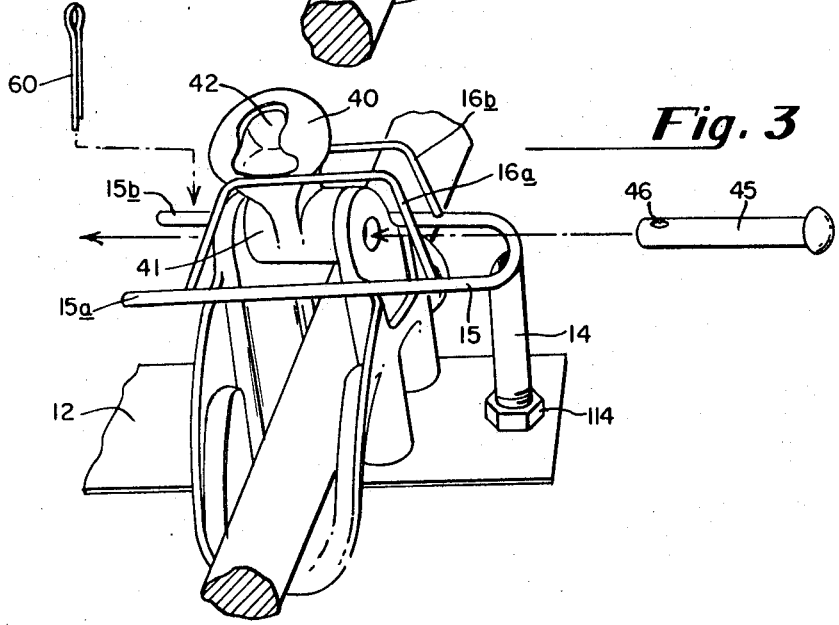
FIG. 3 is a perspective view showing the socket tongue inserted between the clevis ears of the clamp and supported by the guide arms of the tool.

The rearmost ends of the rods 15a and 15b terminate short of the rearward end of the base plate 12 so as to provide a space for supporting the suspension clamp 30 on the base 12 with clearance thereabove for receiving the conductor C. The forward wall 31 of the suspension clamp 30 is tucked under and held by the rearward end portions of the rods 15a and 15b. As seen in FIGS. 1–3 of the drawings, the suspension clamp 30 is generally U-shaped. Each wall thereof, 31 and 32, is provided at its center point with an upstanding clevis ear, 33 and 34, having holes therethrough for receiving a clevis pin 45. The holder 15 is supported above the base plate 12 at a distance such that the holder rods 15a and 15b rest on the shoulders 35 of the side walls of the clamp on both sides of the upstanding clevis ears 33, 34. The post 14 is made adjustable in height, as by a pair of nuts 114 on the threaded lower end of the post. The post 14 passes through a hole in the base plate 12 and is secured thereto by the pair of nuts 114, one of the nuts being above and the other below the base plate, as seen in FIG. 4. The U-shaped holder 15 is secured to the upper end of the post 14, as by welding.

With the suspension clamp 30 supported on the rearward portion of the base plate 12 and held by the engagement of the rods 15a and 15b pressing down on the shoulders 35 of the forward wall 31 only, as illustrated in FIG. 1, the operator, by means of the elongated pole or "hot stick" 20, places the clamp 30 under the energized power-line conductor C and raises it until the power-line conductor C is in the saddle of the clamp 30, as illustrated in FIG. 1. The operator then pulls the pole 20 and its attached holder 10 rearwardly. The suspension clamp 30 is, however, unable to move rearwardly, since it is prevented from doing so by the power-line conductor C. Accordingly, the suspension clamp 30 and the power line conductor C are moved forwardly, relative to the special tool 10, and take up the position, illustrated in FIG. 2, in which the holder rods 15a and 15b rest on the shoulders 35 on both of the side walls 31 and 32.

Another lineman, having a different tool at the end of another "hot stick," then lowers a socket tongue 40 into position between the guide arms 16a and 16b. Socket tongue 40 has a head portion having therein an eye 42 and a depending tongue portion 41. In the socket tongue 41 is a through hole which the operator aligns with the holes in the clevis ears 33 and 34 so that the clevis pin 45 may be inserted to secure the socket tongue 40 to the body of the suspension clamp 30.

With the aid of a "hot stick" and tool of known type, a lineman then inserts the clevis pin 45 through the aligned holes in the clevis ears 33 and 34 and in the tongue 41. When the lineman inserts the clevis pin 45, he sees to it that the cotter key hole 46 is vertically disposed. The cotter key 60, which may preferably be of the hump type, is then inserted in the hole 46 of the clevis pin 45. For this purpose, a special cotter key tool 50, described hereinafter, may be employed.

The way in which the tool 50 is used to insert the cotter key 60 is illustrated in FIGS. 4 and 5. During this insertion, the socket tongue 40 is held in vertically upright position by the guide arms 16a and 16b. The special tool 50, provided by the present invention for inserting the cotter key 60, is secured to the ends of a "hot stick" 120 as by a spline connection 121. The cotter key tool 50 has a forwardly extending marginal flange portion 51 having a slot therein through which the legs of the cotter key 60 extend. An eye pin 55 supports the cotter key 60. Secured to the rearward face of cotter key tool 50 is a guide member 52 which extends downwardly beyond the extremity of the cotter key 60. This guide member 52 has a flared lower end and a surface so spaced from the cotter key 60 that when the cotter key tool 50 is lowered by the lineman, and the face of the guide tool 52 slides down against the end of the clevis pin 45, the legs of the cotter key 60 will be so spaced from the end of the clever pin 45 that the cotter key will enter the hole 46.

To assist in centering the cotter key 60 relative to the clevis pin 45, the cotter key tool 50 is provided with a pair of depending spring members 53 and 54. The upper parts of these spring members are inserted in holes drilled vertically in the body portion of the cotter key tool 50. The springs 53 and 54 extend down below the lower extremity of the cotter key 60. As the cotter key tool 50 is lowered by the lineman in the manner described hereinabove, the springs 53 and 54 engage opposite sides of the clevis pin 45 and embrace the clevis pin, thereby centering the legs of the cotter key 60 relative to the shank of the pin, and thereby enabling the linemen to quickly and easily insert the cotter key 60 into the hole 46. In considering this action, it must be remembered that the lineman is working at a substantial distance from the cotter key and clevis pin; for example, he may be between 10 and 20 feet away.

When the cotter key 60 has been inserted in the hole 46 of the clevis pin 45, the work of securing the clamp 30 to the power line conductor is completed, and the only thing that remains to be done before the special tool 10 may be removed is that of placing the ball of the porcelain disc insulator into the eye 42 of the socket tongue 40. FIG. 6 illustrates in phantom a porcelain disc insulator 70 having a depending ball 71 which is adapted to be received within the eye 42 of the socket tongue 40. With the socket tongue 40 held in upright position by the arms 16a and 16b of the special tool 10, the tool 10 is moved longitudinally along the conductor C until the clamp is in line with the string of suspension disc insulators. The string of insulators is swung to one side by one of the linemen and then is allowed to swing back in pendulum-like manner causing the ball 71 of the lowermost insulator 70 to enter into eye 42 of the socket tongue 40. The guide elements 16a and 16b are resilient, and this property assists the snap engagement of the ball 71 into the eye 42 of socket tongue 40. The insulators are then plumbed and the clamp 30 is adjusted to its final position on the conductor. The function of the special tool 10 has now been completed, and the tool 10 is removed.

After the special tool 10 is removed, final installation of the clamp 30 is completed in the usual manner. This includes placing a keeper on top of the conductor C, inserting U-bolts through the holes in the clamp 30, and securing the U-bolts in the usual manner, by lock washers and nuts.

It has been found that the use of the special tool 10 cuts in half, or at least substantially reduces, the time previously required to install the suspension clamps. As previously indicated, this very substantial reduction in time is accomplished without any increase in hazard.

It will be seen that the tool 10 consists of a support base or carrier having a first portion which has unobstructed space thereabove and a second portion which has holder bars thereabove. The holder bars are supported on the base at one end only, i.e., at the end remote from the first or unobstructed portion. The holder bars are spaced above the base by a distance corresponding to the height of the sidewalls of the U-shape suspension clamp at points on each side of the clevis ears. The holder bars are spaced apart laterally by a distance sufficient to allow the clevis ears to pass therebetween. The socket tongue is supported on the clevis pin and is held in upright position by the arms which project upwardly from the holder bars.

The tool 10 is so designed that the suspension clamp 30 may initially be held by the holder bars on the first portion of the base to allow the clamp to be placed under the line conductor and then lifted up to allow the conductor to pass through the unobstructed space into the trough of the clamp. The pole is then pulled rearwardly to move the clamp to the second portion of the base, and the socket tongue is then added, and the clevis pin inserted, to lock the clamp about the line conductor. The head or eye portion of the socket tongue is held in upright position by the arms on the holder bars until the ball of the line insulator enters the eye or socket.

While I have shown the splined connection for the pole to be located at the edge of the first portion of the base of the tool, i.e., at the edge of the unobstructed portion, the pole connection could be at the other edge of the base, so far as the present invention is concerned.

What is claimed is:

1. A cotter key tool for inserting from a remote location a cotter key in a key hole in a pin, said cotter key tool having:

a. connection means for connecting said tool to an elongated pole, b. a lateral post for supporting the eye of the cotter key,
c. a depending guide member spaced rearwardly from said support post for engaging the end of the pin for locating the legs of the cotter key axially relative to said pin;
d. a pair of opposed depending spring elements for engaging the shank of the pin for locating the legs of the cotter key transversely relative to said pin.

* * * * *